United States Patent
Yang et al.

(10) Patent No.: US 11,114,696 B2
(45) Date of Patent: Sep. 7, 2021

(54) ELECTROLYTE SYSTEM FOR LITHIUM-CHALCOGEN BATTERIES

(71) Applicant: GM Global Technology Operations LLC, Detroit, MI (US)

(72) Inventors: Li Yang, Troy, MI (US); Ning Kang, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 15/856,292

(22) Filed: Dec. 28, 2017

(65) Prior Publication Data
US 2019/0207261 A1    Jul. 4, 2019

(51) Int. Cl.
| | |
|---|---|
| *H01M 10/0568* | (2010.01) |
| *H01M 10/0525* | (2010.01) |
| *H01M 10/0569* | (2010.01) |
| *H01M 10/058* | (2010.01) |
| *H01M 4/58* | (2010.01) |

(52) U.S. Cl.
CPC ..... *H01M 10/0568* (2013.01); *H01M 4/5815* (2013.01); *H01M 10/058* (2013.01); *H01M 10/0525* (2013.01); *H01M 10/0569* (2013.01); H01M 2220/20 (2013.01); H01M 2300/0025 (2013.01); H01M 2300/0028 (2013.01)

(58) Field of Classification Search
None
See application file for complete search history.

(56) References Cited

U.S. PATENT DOCUMENTS

| | | |
|---|---|---|
| 7,517,612 B2 | 4/2009 | Ryu et al. |
| 7,722,994 B2 | 5/2010 | Halalay |
| 8,394,539 B2 | 3/2013 | Geiculescu et al. |
| (Continued) | | |

FOREIGN PATENT DOCUMENTS

| | | |
|---|---|---|
| CN | 1218422 C | 9/2005 |
| CN | 100444457 C | 12/2008 |
| (Continued) | | |

OTHER PUBLICATIONS

Zhou et al. "Selenium-Doped Cathodes for Lithium-Organosulfur Batteries with Greatly Improved Volumetric Capacity and Coulombic Efficiency" Adv. Mater. 2017, 29, 1701294. (Year: 2017).*

(Continued)

*Primary Examiner* — Alix E Eggerding
(74) *Attorney, Agent, or Firm* — Harness, Dickey & Pierce, P.L.C.

(57) ABSTRACT

An electrolyte system for an electrochemical cell having an electrode comprising a chalcogen-containing electroactive material is provided, along with methods of making the electrolyte system. The electrolyte system includes one or more lithium salts dissolved in one or more solvents. The salts have a concentration in the electrolyte of greater than or equal to about 2M to less than or equal to about 5M. The electrochemical cell including the electrolyte system has a minimum potential greater than or equal to about 0.8 V to less than or equal to about 1.8 V and a maximum charge potential of greater than or equal to about 2.5 V to less than or equal to about 3 V.

17 Claims, 4 Drawing Sheets

(56) References Cited

U.S. PATENT DOCUMENTS

| | | | |
|---|---|---|---|
| 8,586,222 B2 | 11/2013 | Timmons et al. | |
| 8,802,301 B2 | 8/2014 | Halalay et al. | |
| 8,974,946 B2 | 3/2015 | Cai et al. | |
| 9,123,939 B2 | 9/2015 | Xiao et al. | |
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,350,046 B2 | 5/2016 | Huang | |
| 9,437,871 B2 | 9/2016 | Zhou et al. | |
| 9,537,144 B2 | 1/2017 | Huang et al. | |
| 9,647,254 B2 | 5/2017 | Dadheech et al. | |
| 9,742,028 B2 | 8/2017 | Zhou et al. | |
| 10,056,590 B2 | 8/2018 | Huang et al. | |
| 10,062,898 B2 | 8/2018 | Xiao | |
| 10,084,204 B2 | 9/2018 | Dai et al. | |
| 10,511,049 B2 | 12/2019 | Yang et al. | |
| 10,707,530 B2 * | 7/2020 | Yang | H01M 10/0569 |
| 2002/0102466 A1 | 8/2002 | Hwang et al. | |
| 2005/0053839 A1 | 3/2005 | Ryu et al. | |
| 2012/0109503 A1 | 5/2012 | Yang et al. | |
| 2013/0337347 A1 | 12/2013 | Pol et al. | |
| 2014/0170459 A1 | 6/2014 | Wang et al. | |
| 2014/0272564 A1 | 9/2014 | Holme et al. | |
| 2015/0056387 A1 | 2/2015 | Dadheech et al. | |
| 2015/0056493 A1 | 2/2015 | Dadheech et al. | |
| 2015/0056507 A1 | 2/2015 | Dadheech et al. | |
| 2015/0118535 A1 | 4/2015 | Smith et al. | |
| 2015/0140446 A1 | 5/2015 | Li | |
| 2015/0236324 A1 | 8/2015 | Xiao et al. | |
| 2015/0236372 A1 | 8/2015 | Yushin et al. | |
| 2015/0333318 A1 * | 11/2015 | Huang | H01M 4/625 429/338 |
| 2015/0349307 A1 | 12/2015 | Dadheech et al. | |
| 2016/0017268 A1 | 1/2016 | Kim et al. | |
| 2016/0020491 A1 | 1/2016 | Dai et al. | |
| 2016/0111721 A1 | 4/2016 | Xiao et al. | |
| 2016/0126589 A1 * | 5/2016 | Xiao | H01M 10/056 429/50 |
| 2016/0141598 A1 | 5/2016 | Dai et al. | |
| 2016/0172665 A1 | 6/2016 | Zhou et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2016/0211498 A1 | 7/2016 | Kim et al. | |
| 2016/0218342 A1 | 7/2016 | Xiao et al. | |
| 2016/0233549 A1 | 8/2016 | Tiruvannamalai et al. | |
| 2016/0254567 A1 | 9/2016 | Cai et al. | |
| 2016/0344063 A1 | 11/2016 | Chang et al. | |
| 2017/0162859 A1 | 6/2017 | Yang et al. | |
| 2017/0187070 A1 | 6/2017 | Park et al. | |
| 2017/0214079 A1 | 7/2017 | Dai et al. | |
| 2017/0222210 A1 | 8/2017 | Xiao | |
| 2017/0271678 A1 | 9/2017 | Yang et al. | |
| 2017/0288230 A1 | 10/2017 | Yang et al. | |
| 2017/0338490 A1 | 11/2017 | Xiao et al. | |
| 2018/0048022 A1 | 2/2018 | Yang et al. | |
| 2018/0062136 A1 | 3/2018 | Huang et al. | |
| 2018/0062206 A1 | 3/2018 | Yang et al. | |
| 2018/0108952 A1 | 4/2018 | Yang et al. | |
| 2018/0287207 A1 | 10/2018 | Dai et al. | |
| 2018/0309165 A1 | 10/2018 | Yersak et al. | |
| 2018/0309166 A1 | 10/2018 | Yersak et al. | |
| 2018/0375148 A1 | 12/2018 | Yersak et al. | |
| 2019/0044134 A1 | 2/2019 | Liu et al. | |
| 2019/0044181 A1 * | 2/2019 | Xu | H01M 10/056 |
| 2019/0058210 A1 | 2/2019 | Dai et al. | |
| 2019/0058211 A1 | 2/2019 | Yang et al. | |
| 2019/0058219 A1 | 2/2019 | Yang et al. | |
| 2019/0067675 A1 | 2/2019 | Xiao | |
| 2019/0067744 A1 | 2/2019 | Xiao et al. | |
| 2019/0089006 A1 | 3/2019 | Yang et al. | |
| 2019/0207261 A1 | 7/2019 | Yang et al. | |

FOREIGN PATENT DOCUMENTS

| | | |
|---|---|---|
| CN | 102306835 A | 1/2012 |
| CN | 105280953 A | 1/2016 |
| CN | 109411823 A | 3/2019 |
| CN | 109411827 A | 3/2019 |
| CN | 109980285 A | 7/2019 |
| DE | 102015111777 A1 | 1/2016 |
| DE | 102018119665 A1 | 2/2019 |
| DE | 102018119769 A1 | 2/2019 |
| DE | 102018133535 A1 | 7/2019 |
| JP | 2008198524 A | 8/2008 |
| WO | WO-2013155038 A1 | 10/2013 |

OTHER PUBLICATIONS

Li Yang et al.; U.S. Appl. No. 15/677,249, filed Aug. 15, 2017 entitled "Ether-Based Electrolyte System Improving or Supporting Anodic Stability of Electrochemical Cells Having Lithium-Containing Anodes"; 44 pages.

Li Yang et al.; U.S. Appl. No. 15/677,389, filed Aug. 15, 2017 entitled "Carbonate-Based Electrolyte System Improving or Supporting Efficiency of Electrochemical Cells Having Lithium-Containing Anodes"; 41 pages.

First Office Action for Chinese Application No. 201510629022.9 dated May 15, 2017; 5 pages.

Second Office Action for Chinese Application No. 201510629022.9 dated Nov. 23, 2017; 6 pages.

Xingcheng Xiao et al.; U.S. Appl. No. 15/692,107, filed Aug. 31, 2017 entitled "Methods of Applying Self-Forming Artificial Solid Electrolyte Interface (SEI) Layer to Stabilize Cycle Stability of Electrodes in Lithium Batteries"; 45 pages.

Fang Liu et al.; U.S. Appl. No. 15/666,170, filed Aug. 1, 2017 entitled "Conformal Coating of Lithium Anode Via Vapor Deposition for Rechargeable Lithium Ion Batteries"; 52 pages.

Fang Dai et al.; U.S. Appl. No. 15/677,760, filed Aug. 15, 2017 entitled "Lithium Metal Battery With Hybrid Electrolyte System"; 48 pages.

Li Yang et al.; U.S. Appl. No. 15/237,378, filed Aug. 15, 2016 entitled "Gel Electrolytes and Precursors Thereof"; 23 pages.

Li Yang et al.; U.S. Appl. No. 15/710,326, filed Sep. 20, 2017 entitled "Hybrid Metal-Organic Framework Separators for Electrochemical Cells"; 46 pages.

Xiaosong Huang; U.S. Appl. No. 15/253,052, filed Aug. 31, 2016 entitled "Methods of Making Separators for Lithium Ion Batteries"; 46 pages.

Fang Dai et al.; U.S. Appl. No. 15/473,052, filed Mar. 29, 2017 entitled "Microporous and Hierarchical Porous Carbon"; 48 pages.

Li Yang et al.; U.S. Appl. No. 15/295,600, filed Oct. 17, 2016 entitled "Three-Electrode Test Cell"; 33 pages.

Jie Gao et al. "Effects of Liquid Electrolytes on the Charge Discharge Performance of Rechargeable Lithium/Sulfur Batteries: Electrochemical and in-Situ X-ray Absorption Spectroscopic Studies" *J. Phys. Chem. C* 2011, 115, 25132-25137.

Chen et al., RSC Adv. 2013, 3, 3540.

Xu et al., Adv. Energy Mater.. 2013, 3, 833.

Jiangfeng Qian et al.; "High Rate and Stable Cycling of Lithium Metal Anode"; Nature Communications; DOI: 10.1038/ncomms7362; Feb. 20, 2015; 9 pages.

Fei Ding et al.; "Effects of Carbonate Solvents and Lithium Salts on Morphology and Coulombic Efficiency of Lithium Electrode"; Journal of the Electrochemical Society; pp. A1894-A1901; Sep. 4, 2013; 8 pages.

Vinodkumar Etacheri et al.; "Challenges in the Development of Advanced Li-Ion Batteries: A Review"; Energy & Environmental Science, DOI:10.1039/c1ee01598b; www.rsc.org/ees; Jul. 26, 2011; 21 pages.

* cited by examiner

ELECTROLYTE SYSTEM FOR LITHIUM-CHALCOGEN BATTERIES

INTRODUCTION

This section provides background information related to the present disclosure which is not necessarily prior art.

The present disclosure relates to electrolyte systems for electrochemical cells having electrodes including a chalcogen-containing electroactive material, and methods relating to the preparation of the electrolyte systems.

By way of background, high-energy density, electrochemical cells, such as lithium-ion batteries and lithium-sulfur chalcogen batteries can be used in a variety of consumer products and vehicles, such as Hybrid Electric Vehicles (HEVs) and Electric Vehicles (EVs). Typical lithium-ion and lithium-sulfur chalcogen batteries comprise a first electrode, a second electrode, an electrolyte material, and a separator. One electrode serves as a positive electrode or cathode and the other serves as a negative electrode or anode. Often a stack of lithium-ion battery cells are electrically connected to increase overall output. Conventional rechargeable lithium-ion and lithium-sulfur chalcogen batteries operate by reversibly passing lithium ions back and forth between the negative electrode and the positive electrode. An electrically insulating separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for lithium-ion batteries and lithium-chalcogen batteries (e.g., lithium-sulfur chalcogen batteries, lithium-selenium chalcogen batteries). By way of non-limiting example, cathode materials for lithium-ion batteries typically comprise an electroactive material which can be intercalated or alloyed with lithium ions. The electrolyte typically contains one or more lithium salts which may be dissolved and ionized in a non-aqueous solvent, for example, a carbonate-based solvent system or an ether-based solvent system. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \le x \le 3$, such as $Li_4Ti_5O_{12}$ (LTO). The negative electrode may also be made of a lithium-containing material, such as metallic lithium, so that the electrochemical cell is considered a lithium metal battery or cell.

Electrochemical cells, in particular lithium-chalcogen batteries, having an electrolyte including lithium nitrate ($LiNO_3$) generally have a minimum voltage of about 1.8 V because lithium nitrate ($LiNO_3$) decomposes and become gaseous thereafter. This minimum voltage may result in about a 15% energy loss. Nonetheless, lithium nitrate ($LiNO_3$) is generally included in the electrolyte for lithium-chalcogen rechargeable batteries to induce successful cycling of the electrochemical cell. Further, the electrolyte system may be generally limited to ether-based solvents, as opposed to, for example, carbonate-based electrolytes, because of negative effects of active radical chalcogens, in particular in regard to sulfur-based batteries, that can be formed in the presence of carbonate-based electrolytes. Accordingly, it would be desirable to develop materials for use in lithium-chalcogen rechargeable batteries, in particular, lithium-sulfur and lithium-selenium chalcogen batteries that have both increased energy densities and desired levels of redox reactions.

SUMMARY

This section provides a general summary of the disclosure, and is not a comprehensive disclosure of its full scope or all of its features.

In various aspects, the present disclosure provides an electrochemical cell that cycles lithium ions. The electrochemical cell may include an electrode comprising a chalcogen-containing electroactive material and an electrolyte system including one or more lithium salts selected from the group consisting of: lithium bis(fluorosulfonyl)imide ($LiN(FSO_2)_2$), bis(trifluoromethane)sulfonimide lithium salt ($LiN(CF_3SO_2)_2$), lithium hexafluorophosphate ($LiPF_6$), lithium hexafluoroarsenate ($LiAsF_6$), lithium tetrafluoroborate ($LiBF_4$), lithium perchlorate ($LiClO_4$), lithium iodide (LiI), lithium bromide (LiBr), lithium thiocyanate (LiSCN), lithium difluoro(oxalato)borate ($LiBF_2(C_2O_4)$), $LiPF_3(C_2F_5)_3$, $LiPF_4(CF_3)_2$, lithium tetrafluoro(oxalato)phosphate ($LiPF_4(C_2O_4)$), $LiPF_3(CF_3)_3$, $LiSO_3CF_3$, and combinations thereof; and one or more solvents selected from the group consisting of: cyclic carbonates, linear carbonates, aliphatic carboxylic esters, γ-lactones, chain structures ethers, cyclic ethers, and combinations thereof. The electrolyte system may be substantially free of lithium nitrate ($LiNO_3$); and the electrochemical cell may have a minimum charge potential of greater than or equal to about 0.8 V to less than or equal to about 1.8 V.

In one aspect, the electrochemical cell may have a maximum charge potential of greater than or equal to about 2.5 V to less than or equal to about 3 V.

In one aspect, the one or more lithium salts may have a concentration in the electrolyte system of greater than or equal to about 2 M to less than or equal to about 5 M.

In one aspect, the cyclic carbonates may be selected from the group consisting of: ethylene carbonate (EC), propylene carbonate (PC), butylene carbonate, fluoroethylene carbonate (FEC), and combinations thereof the linear carbonates may be selected from the group consisting of: dimethyl carbonate (DMC), dimethyl dicarbonate (DMDC), diethyl carbonate (DEC), ethylmethyl carbonate (EMC), and combinations thereof the aliphatic carboxylic esters may be selected from the group consisting of: methyl formate, methyl acetate, methyl propionate, and combinations thereof; the γ-lactones may be selected from the group consisting of: γ-butyrolactone, γ-valerolactone, and combinations thereof; the chain structures ethers may be selected from the group consisting of: 1,2-dimethoxyethane, 1,2-diethoxyethane, ethoxymethoxyethane, and combinations thereof; and the cyclic ethers may be selected from the group consisting of: 1,3-dioxolane, tetrahydrofuran, 2-methyltetrahydrofuran, and combinations thereof.

In one aspect, the chalcogen-containing electroactive material may include elemental sulfur or a sulfur-containing active material.

In one aspect, the chalcogen-containing electroactive material may include elemental selenium or a selenium-containing active material.

In one aspect, the electrochemical cell may have a Coulombic capacity loss of less than or equal to about 10% after 25 cycles of cycling lithium ions in the electrode of the electrochemical cell.

In another variation, the present disclosure provides another example electrochemical cell that cycles lithium ions. The electrochemical cell may include a positive electrode comprising a chalcogen-containing electroactive material; a separator; a negative electrode comprising a negative electroactive material; and an electrolyte system including one or more lithium salts selected from the group consisting of: lithium bis(fluorosulfonyl)imide ($LiN(FSO_2)_2$), bis(trifluoromethane)sulfonimide lithium salt ($LiN(CF_3SO_2)_2$), lithium hexafluorophosphate ($LiPF_6$), lithium hexafluoroarsenate ($LiAsF_6$), lithium tetrafluoroborate ($LiBF_4$), lithium perchlorate ($LiClO_4$), lithium iodide (LiI), lithium bromide (LiBr), lithium thiocyanate (LiSCN), lithium difluoro(oxalato)borate ($LiBF_2(C_2O_4)$), $LiPF_3(C_2F_5)_3$, $LiPF_4(CF_3)_2$, lithium tetrafluoro(oxalato)phosphate ($LiPF_4(C_2O_4)$), $LiPF_3(CF_3)_3$, $LiSO_3CF_3$, and combinations thereof; and one or more solvents selected from the group consisting of: ethylene carbonate (EC), propylene carbonate (PC), butylene carbonate, fluoroethylene carbonate (FEC), dimethyl carbonate (DMC), dimethyl dicarbonate (DMDC), diethyl carbonate (DEC), ethylmethyl carbonate (EMC), methyl formate, methyl acetate, methyl propionate, γ-butyrolactone, γ-valerolactone, 1,2-dimethoxyethane, 1,2-diethoxyethane, ethoxymethoxyethane, 1,3-dioxolane, tetrahydrofuran, 2-methyltetrahydrofuran, and combinations thereof. The electrolyte system may be substantially free of lithium nitrate ($LiNO_3$); and the electrochemical cell may have a minimum charge potential of greater than or equal to about 0.8 V to less than or equal to about 1.8 V and a maximum charge potential of greater than or equal to about 2.5 V to less than or equal to about 3 V.

In one aspect, the one or more lithium salts have a concentration in the electrolyte system of greater than or equal to about 2 M to less than or equal to about 5 M.

In one aspect, the chalcogen-containing electroactive material may include elemental sulfur or a sulfur-containing active material.

In one aspect, the chalcogen-containing electroactive material may include elemental selenium or a selenium-containing active material.

In one aspect, the electrochemical cell may have a Coulombic capacity loss of less than or equal to about 10% after 25 cycles of cycling lithium ions in the electrode of the electrochemical cell.

In yet another variation, the present disclosure provides a method of preparing an electrolyte system that improves or enhances the energy density and promotes stable cycling performance of an electrochemical cell including an electrode comprising a chalcogen-containing electroactive material. The electrochemical cell may have a minimum charge potential of greater than or equal to about 0.8 V to less than or equal to about 1.8 V and a maximum charge potential of greater than or equal to about 2.5 V to less than or equal to about 3 V. The method may include mixing one or more lithium salts selected from the group consisting of: lithium bis(fluorosulfonyl)imide ($LiN(FSO_2)_2$), bis(trifluoromethane)sulfonimide lithium salt ($LiN(CF_3SO_2)_2$), lithium hexafluorophosphate ($LiPF_6$), lithium hexafluoroarsenate ($LiAsF_6$), lithium tetrafluoroborate ($LiBF_4$), lithium perchlorate ($LiClO_4$), lithium iodide (LiI), lithium bromide (LiBr), lithium thiocyanate (LiSCN), lithium difluoro(oxalato)borate ($LiBF_2(C_2O_4)$), $LiPF_3(C_2F_5)_3$, $LiPF_4(CF_3)_2$, lithium tetrafluoro(oxalato)phosphate ($LiPF_4(C_2O_4)$), $LiPF_3(CF_3)_3$, $LiSO_3CF_3$, and combinations thereof; and one or more solvents selected from the group consisting of: cyclic carbonates, linear carbonates, aliphatic carboxylic esters, γ-lactones, chain structures ethers, cyclic ethers, and combinations thereof. The electrolyte system may be substantially free of lithium nitrate ($LiNO_3$).

In one aspect, the one or more lithium salts may have a concentration in the electrolyte system of greater than or equal to about 2 M to less than or equal to about 5 M.

In one aspect, the cyclic carbonates may be selected from the group consisting of: ethylene carbonate (EC), propylene carbonate (PC), butylene carbonate, fluoroethylene carbonate (FEC), and combinations thereof; the linear carbonates may be selected from the group consisting of: dimethyl carbonate (DMC), dimethyl dicarbonate (DMDC), diethyl carbonate (DEC), ethylmethyl carbonate (EMC), and combinations thereof; the aliphatic carboxylic esters may be selected from the group consisting of: methyl formate, methyl acetate, methyl propionate, and combinations thereof; the γ-lactones may be selected from the group consisting of: γ-butyrolactone, γ-valerolactone, and combinations thereof; the chain structures ethers may be selected from the group consisting of: 1,2-dimethoxyethane, 1,2-diethoxyethane, ethoxymethoxyethane, and combinations thereof; and the cyclic ethers may be selected from the group consisting of: 1,3-dioxolane, tetrahydrofuran, 2-methyltetrahydrofuran, and combinations thereof.

In one aspect, the chalcogen-containing electroactive material may include elemental sulfur or a sulfur-containing active material.

In one aspect, the chalcogen-containing electroactive material may include elemental selenium or a selenium-containing active material.

In one aspect, the electrochemical cell may have a capacity loss of less than or equal to about 10% over 100 cycles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is a graphical illustration of voltages (V) and capacities (mAh); and FIG. 2B is a graphical illustration of differential capacity analyses (dQ/dV) and voltages (V).

Figure 3A:
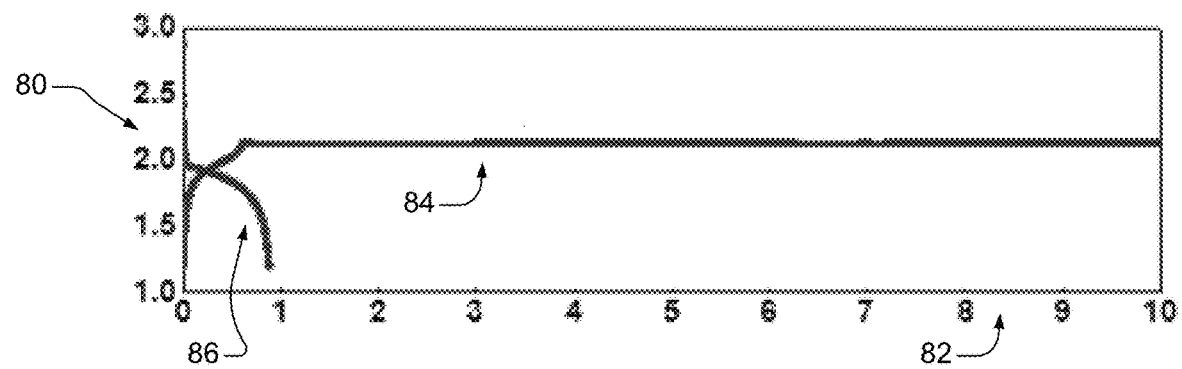
Figure 3B:
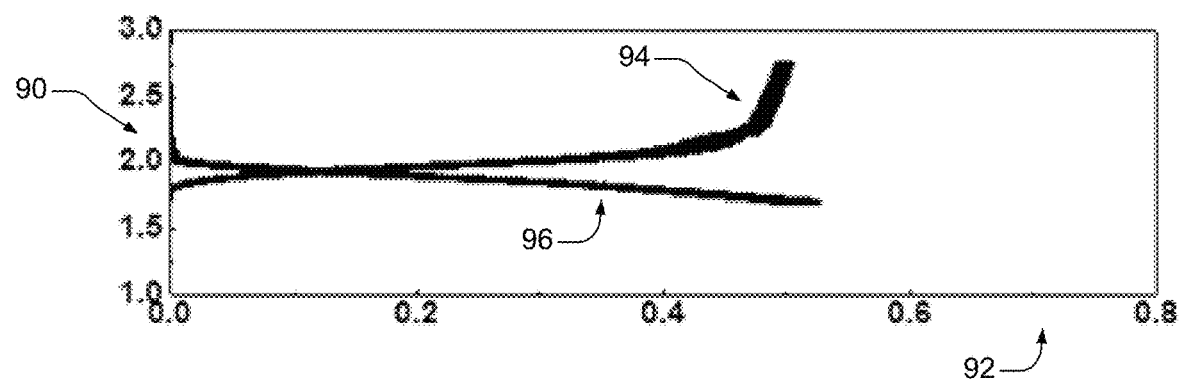
Figure 3C:
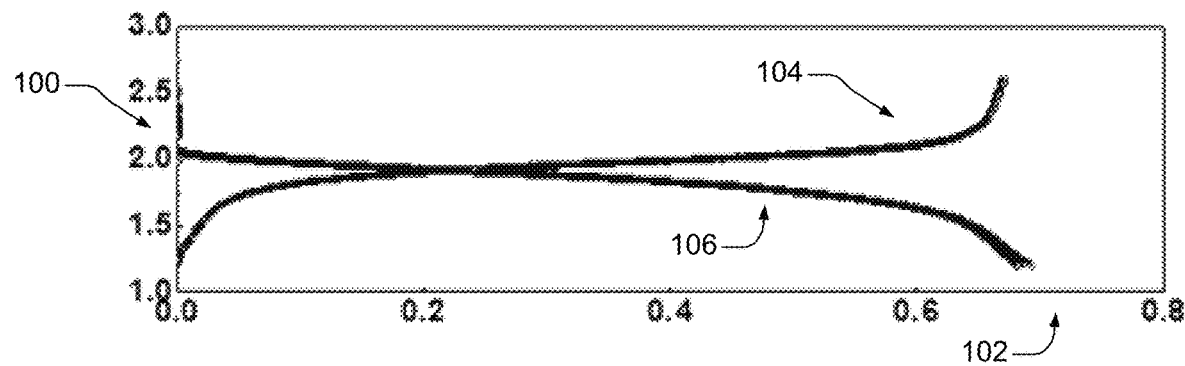

FIGS. 3A-3C are graphical illustrations for a lithium-selenium chalcogen battery; FIG. 3A is a graphical illustration of voltages (V) and capacities (mAh) for a lithium-selenium chalcogen battery having an electrolyte system including a carbonate-based solvent; FIG. 3B is a graphical illustration of voltages (V) and capacities (mAh) for a lithium-selenium chalcogen battery having an electrolyte system including a carbonate-based solvent and lithium nitrate ($LiNO_3$); and FIG. 3C is a graphical illustration of a voltages (V) and capacities (mAh) for a lithium-selenium chalcogen battery having an electrolyte system prepared in accordance with certain aspects of the present disclosure.

Figure 4:
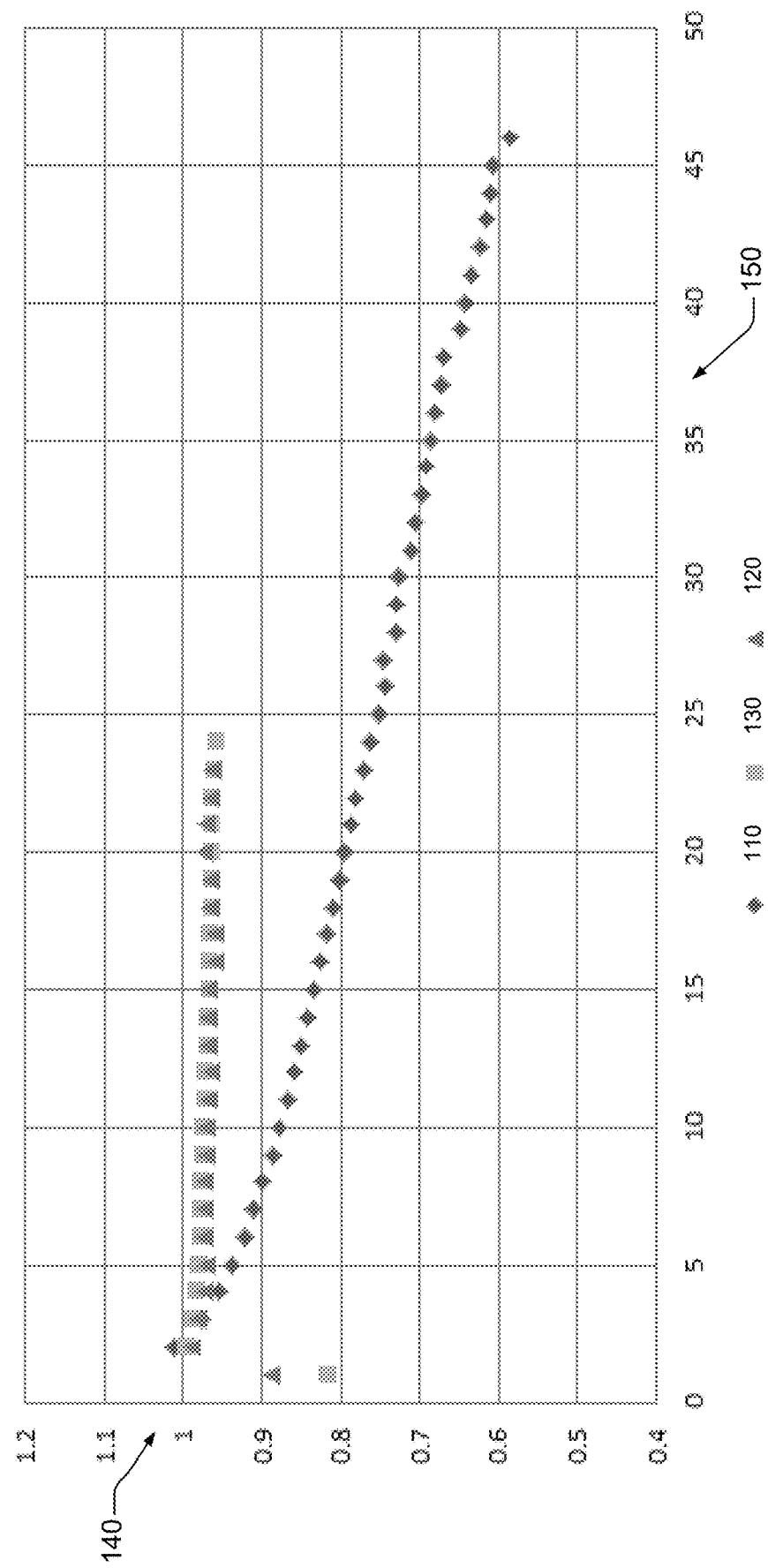

FIG. 4 is a graphical illustration of the capacity retention per cycle of example an electrochemical cell including an electrolyte system prepared in accordance with certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, including batteries, especially lithium ion batteries, lithium sulfur batteries, and lithium selenium batteries, which may be used in vehicle applications. However, the present technology may also be used in other electrochemical devices; especially those that comprise lithium, such as other lithium-chalcogen batteries. Thus, the discussion of lithium-ion batteries and lithium-sulfur and lithium-selenium chalcogen batteries herein is non-limiting.

Figure 1:
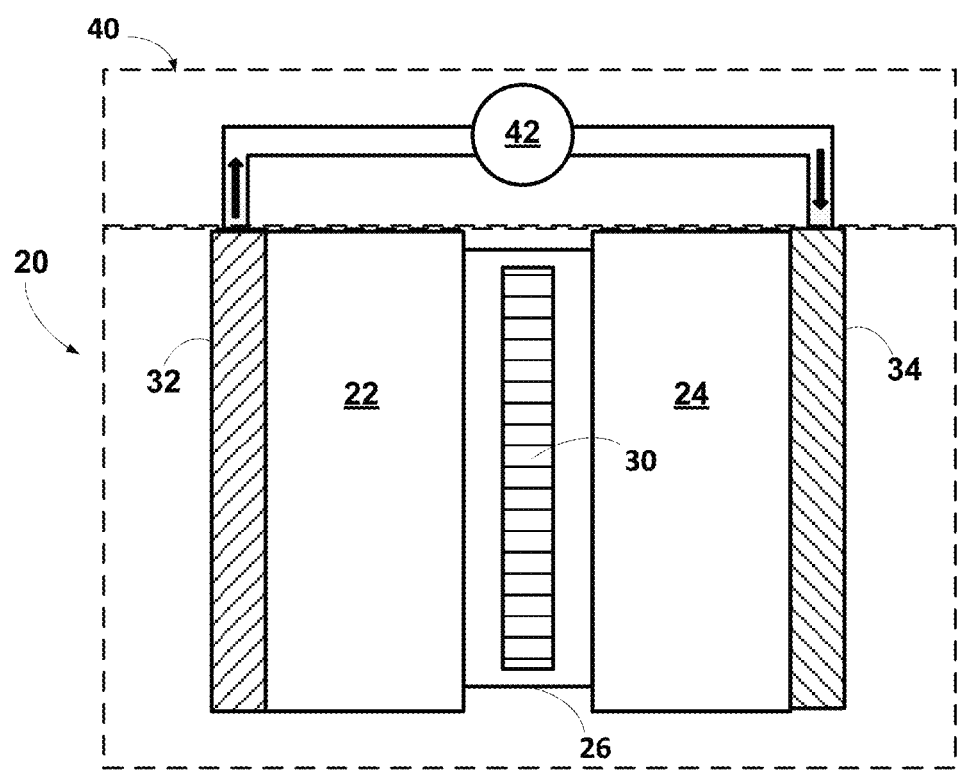
FIG. 1 is a schematic of an exemplary electrochemical battery cell including a separator.

An exemplary and schematic illustration of a battery 20 that cycles lithium ions is shown in FIG. 1. The battery 20 may be a lithium ion electrochemical cell, a lithium sulfur electrochemical cell, or a lithium selenium battery, each including a negative electrode 22, a positive electrode 24, and a porous separator 26 disposed between the two electrodes 22, 24. The porous separator 26 includes an electrolyte system 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20. While in lithium-ion batteries, lithium intercalates and/or alloys in the electrode active materials, in a lithium sulfur battery or a lithium selenium battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 24. The electrons, which flow back towards the negative electrode 22 through the external circuit 40, and the lithium ions, which are carried by the electrolyte system 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, lithium sulfur and lithium selenium battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and handheld consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the porous separator 26 may include, in certain instances, a microporous polymeric separator including a polyolefin, by way of non-limiting example. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In a lithium ion battery, the positive electrode 24 may be formed from a lithium-based active material that can sufficiently undergo lithium intercalation and deintercalation, alloying and dealloying, or plating and stripping, while functioning as the positive terminal of the battery 20. For example, in a lithium-sulfur chalcogen battery, the positive electrode 24 may include sulfur-based compounds as a positive active material. A sulfur-based compound may be selected from at least one of: elemental sulfur, $Li_2Sn$ (wherein n is greater than or equal to 1), $Li_2Sn$ (wherein n is greater than or equal to 1) dissolved in a catholyte, an organosulfur compound, a carbon-sulfur polymer (e.g., $(C_2S_x)_n$, where x=2.5 and n is greater than or equal to 2), and combinations thereof. In a lithium-selenium chalcogen battery, the positive electrode 24 may include selenium-based compounds as a positive active material. A selenium-based compound may be selected from one of: elemental selenium, selenium sulfide alloys, and combinations thereof.

In certain variations, the positive active materials may be intermingled with an optional electrically conductive material and at least one polymeric binder material to structurally fortify the positive active material along with an optional electrically conductive particle distributed therein. For example, the active materials and optional conductive materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum (Al) or any other appropriate electrically conductive material known to those of skill in the art.

In various aspects, the negative electrode 22 includes an electroactive material as a lithium host material capable of functioning as a negative terminal of a lithium-ion battery. In certain aspects, the electroactive material comprises lithium and may be lithium metal. The negative electrode 22 may thus include the electroactive lithium host material and optionally another electrically conductive material, as well as one or more polymeric binder materials to structurally hold the lithium host material together. For example, in certain instances, the negative electrode 22 may include an active material including graphite, silicon (Si), tin (Sn), or other negative electrode particles intermingled with a binder material selected from the group consisting of: polyvinylidene difluoride (PVDF), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate, polyimide, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain instances, lithium-titanium anode materials are contemplated, such as $Li_{4+x}Ti_5O_{12}$, where $0 \leq x \leq 3$, including lithium titanate ($Li_4Ti_5O_{12}$) (LTO). The negative electrode current collector 32 may be formed from copper (Cu) or any other appropriate electrically conductive material known to those of skill in the art.

In various aspects, the positive electrode 24, the negative electrode 22, and the separator 26 may each include an electrolyte solution or system 30, capable of conducting lithium ions between the negative electrode 22 and the positive electrode 24. The electrolyte system 30 may be a non-aqueous liquid electrolyte solution that includes one or more salts dissolved in a solvent or a mixture of solvents. In various aspects, the one or more salts may have a concentration in the electrolyte of greater than or equal to about 2M to less than or equal to about 5M, and optionally, in certain aspects, greater than or equal to about 2.5 M to less than or equal to about 4.5 M.

In certain variations, the one or more salts may comprise one or more lithium salts selected from the group consisting of: lithium bis(fluorosulfonyl)imide ($LiN(FSO_2)_2$) ("LIFSI"), bis(trifluoromethane)sulfonimide lithium salt ($LiN(CF_3SO_2)_2$) ("LITFSI"), lithium hexafluorophosphate ($LiPF_6$), lithium hexafluoroarsenate ($LiAsF_6$), lithium tetrafluoroborate ($LiBF_4$), lithium perchlorate ($LiClO_4$), lithium iodide (LiI), lithium bromide (LiBr), lithium thiocyanate (LiSCN), lithium difluoro(oxalato)borate ($LiBF_2(C_2O_4)$) ("LiODFB"), $LiPF_3(C_2F_5)_3$ ("LiFAP"), $LiPF_4(CF_3)_2$, lithium tetrafluoro(oxalato)phosphate ($LiPF_4(C_2O_4)$) ("LiFOP"), $LiPF_3(CF_3)_3$, $LiSO_3CF_3$, and combinations thereof. Optionally, in certain aspects, the one or more lithium salts may be selected from the group consisting of: lithium bis(fluorosulfonyl)imide ($LiN(FSO_2)_2$) ("LIFSI"), bis(trifluoromethane)sulfonimide lithium salt ($LiN(CF_3SO_2)_2$) ("LITFSI"), and combinations thereof.

In certain variations, the solvent or mixture of solvents may comprise one or more organic solvents selected from the group consisting of: cyclic carbonates, linear carbonates, aliphatic carboxylic esters, γ-lactones, chain structures ethers, cyclic ethers, and combinations thereof. In various aspects, the cyclic carbonates may be selected from the group consisting of: ethylene carbonate (EC), propylene carbonate (PC), butylene carbonate, fluoroethylene carbonate (FEC), and combinations thereof; the linear carbonates may be selected from the group consisting of: dimethyl carbonate (DMC), dimethyl dicarbonate (DMDC), diethyl carbonate (DEC), ethylmethyl carbonate (EMC), and combinations thereof; the aliphatic carboxylic esters may be selected from the group consisting of: methyl formate, methyl acetate, methyl propionate, and combinations thereof; the γ-lactones may be selected from the group consisting of: γ-butyrolactone, γ-valerolactone, and combinations thereof; the chain structures ethers may be selected from the group consisting of: 1,2-dimethoxyethane (DME), 1,2-diethoxyethane, ethoxymethoxyethane, and combinations thereof; and the cyclic ethers may be selected from the group consisting of: 1,3-dioxolane, tetrahydrofuran, 2-methyltetrahydrofuran, and combinations thereof. Optionally, in certain aspects, the one or more solvents may be selected from the group consisting of: 1,2-dimethoxyethane (DME), dimethyl dicarbonate (DMDC), fluoroethylene carbonate (FEC), and combinations thereof.

In various aspects, electrolyte system 30 improves the energy density and promotes stable long-term cycling performance of the battery 20, in particular, without the inclusion of lithium nitrate ($LiNO_3$) and without a general limitation on solvent class (e.g., carbonate-based solvent versus ether-based solvent). The electrochemical cell including the electrolyte system 30 may have a minimum potential greater than or equal to about 0.8 V to less than or equal to about 1.8 V and a maximum charge potential of greater than or equal to about 2.5 V to less than or equal to about 3 V, and optionally, in certain aspects, a maximum charge potential of greater than or equal to about 2.7 V to less than or equal to about 3 V.

Figure 2A:
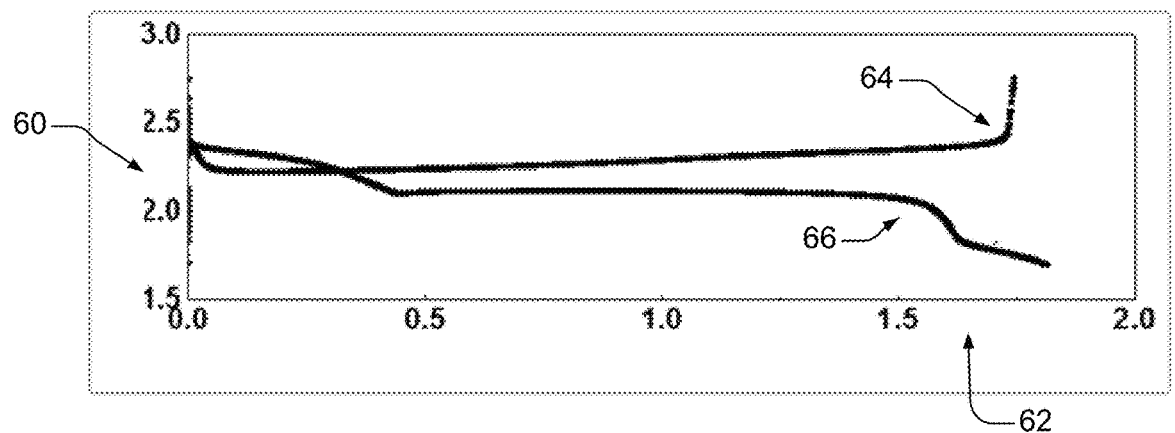
FIGS. 2A-2B are graphical illustrations for a lithium-sulfur chalcogen battery having an electrolyte system including an ether-based solvent and lithium nitrate ($LiNO_3$)
Figure 2B:
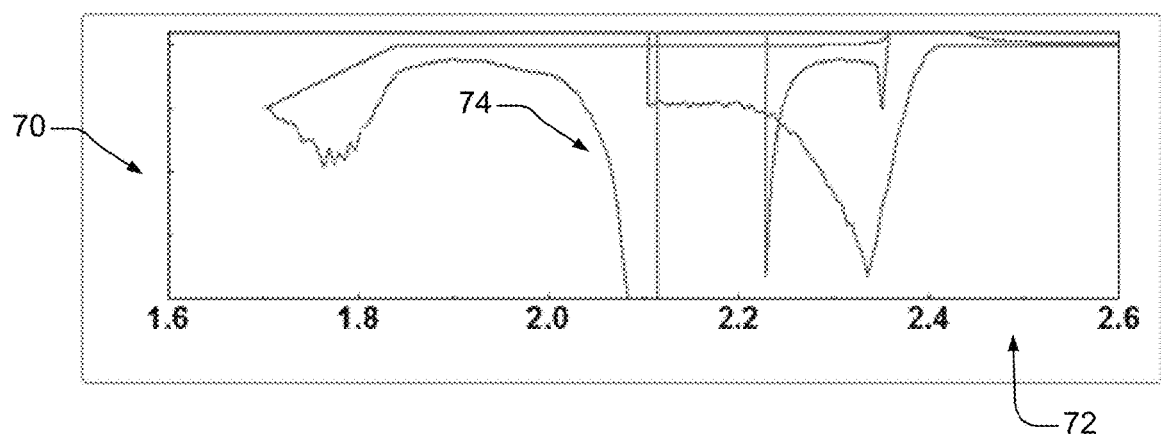

By way of non-limiting background, lithium-chalcogen rechargeable batteries where the chalcogen-containing electroactive material includes elemental sulfur or a sulfur-containing active material generally require use of a ether-based electrolyte system because of internal redox reactions forming active radicals that attack one or more of the solvents, in particular, carbonate-based solvents. Such electrolyte systems often require, however, the use or inclusion of lithium nitrate ($LiNO_3$), in the absence of which the lithium-sulfur chalcogen battery may not successfully charge or cycle. Such batteries, as seen in FIGS. 2A-2B, have a minimum or cut-off voltage of about 1.8 V because lithium nitrate ($LiNO_3$) decomposes and become gaseous thereafter, which may result in an energy loss, for example, about 15% energy loss. Further, as illustrated, the lithium-sulfur chalcogen battery has a capacity of less than about 0.5 mAh. The y-axis or vertical axis 60 of FIG. 2A depicts the voltage (V), while the x-axis or horizontal axis 62 depicts capacity in milliamp hour (mAh). Line 64 of FIG. 2A is the charge voltage curve, while line 66 illustrate the decomposition of lithium nitrate ($LiNO_3$) within a lithium-sulfur chalcogen battery including an ether-based solvent. The y-axis or vertical axis 70 of FIG. 2B depicts the differential capacity analysis (dQ/dV), while the x-axis or horizontal axis 72 depicts voltage (V). Line 74 of FIG. 2B illustrates the lithium nitrate ($LiNO_3$) decomposed voltage, which starts at about 1.85 V.

Comparatively, lithium-chalcogen rechargeable batteries where the chalcogen-containing electroactive material includes elemental selenium or a selenium-containing active material are not generally limited to ether-based electrolyte systems, because the elemental selenium or selenium-containing active material does not form the same active radicals as sulfur, for example. Though allowing for use of a larger variety of solvents, the electrolyte systems of many lithium-selenium chalcogen batteries nonetheless also require the use or inclusion of lithium nitrate ($LiNO_3$), in the absence of which the lithium-selenium chalcogen battery may not successfully charge or cycle because of, for example, internal redox reaction therein.

As seen in FIG. 3A, absent the use or inclusion of lithium nitrate ($LiNO_3$), the potential of the lithium-selenium chalcogen battery plateaus at about 2.2 V. The y-axis or vertical axis 80 of FIG. 3A depicts the voltage (V), while the x-axis or horizontal axis 82 depicts capacity in milliamp hour (mAh). Line 84 of FIG. 3A illustrates the charge voltage, while line 86 is the discharge voltage curve. Line 84 clearly shows an internal redox reaction. As seen in FIG. 3B, the charge potential of the lithium-selenium chalcogen battery increases (see line 94) when the system includes lithium nitrate ($LiNO_3$). However, as in FIG. 2A, the lithium-selenium chalcogen battery has a minimum or cut-off voltage of about 1.8 V (see line 96) because lithium nitrate ($LiNO_3$) decomposes and become gaseous thereafter, which may result in about a 15% energy loss. Further, as illustrated, the lithium-selenium chalcogen battery has a capacity of less than about 0.5 mAh. The y-axis or vertical axis 90 of FIG. 3B depicts the voltage (V), while the x-axis or horizontal axis 92 depicts capacity in milliamp hour (mAh). Line 94 of FIG. 3B illustrates the successful suppression of an internal redox reaction, while line 96 illustrates the discharge voltage.

FIG. 3C illustrates a lithium-selenium chalcogen battery including an electrolyte system prepared in accordance with certain aspects of the present disclosure. The electrolyte system includes a concentration of about 4.0 M lithium bis(fluorosulfonyl)imide ($LiN(FSO_2)_2$) ("LIFSI") in 1,2-dimethoxyethane. As illustrated, the lithium-selenium chalcogen battery including the electrolyte system, prepared in accordance with certain aspects of the present disclosure, has a minimum potential greater than or equal to about 0.8 V to less than or equal to about 1.8 V and a maximum charge potential of greater than or equal to about 2.5 V to less than or equal to about 3 V and a capacity equal to about 0.7 mAh. The lithium-chalcogen battery including an electrolyte system prepared in accordance with certain aspects of the present disclosure (e.g., 30) thus allows for sufficient redox but also has an improved energy density. The y-axis or vertical axis 100 of FIG. 3C depicts the voltage (V), while the x-axis or horizontal axis 102 depicts capacity in milliamp hour (mAh). Line 104 of FIG. 3C illustrates successful charge of the lithium-selenium chalcogen battery, including the prepared electrolyte system, to about 2.7 V, absent lithium nitrate ($LiNO_3$), while line 106 illustrates the discharge voltage.

In certain aspects, the electrochemical cell including a chalcogen-containing electrode active material and an electrolyte system as described above has good capacity retention, for example, having a Coulombic capacity loss of less than or equal to about 10% after 25 cycles of cycling lithium ions in the electrode of the electrochemical cell.

Embodiments of the present technology are further illustrated through the following non-limiting example.

Example 1

FIG. 4 shows the charging and discharging profiles (e.g., cycle life) of comparative electrochemical cells 110, 120, and 130 including an electrode comprising a chalcogen-containing electroactive material and varying electrolyte systems comprising one or more lithium salts together with one or more solvents. The y-axis or vertical axis 140 depicts the capacity retention in milliamp hour (mAh), while the cycle number is shown on the x-axis 150. Electrochemical cell 110 includes a traditional, baseline electrolyte system comprising lithium salts bis(trifluoromethane)sulfonimide lithium salt ($LiN(CF_3SO_2)_2$) ("LITFSI") and lithium nitrate ($LiNO_3$) in 1,2-dimethoxyethane (DME). Electrochemical cells 120 and 130 include electrolyte systems prepared in accordance with certain aspects of the present disclosure. In particular, the electrolyte system of electrochemical cell 120 includes lithium bis(fluorosulfonyl)imide (LiN(FSO$_2$)$_2$) ("LIFSI") in 1,2-dimethoxyethane (DME), an ether-based solvent. The electrolyte system of electrochemical cell 130 includes lithium bis(fluorosulfonyl)imide (LiN(FSO$_2$)$_2$) ("LIFSI") in dimethyl dicarbonate (DMDC), a carbonate-based solvent. The electrolyte systems of electrochemical cells 120 and 130 have a lithium bis(fluorosulfonyl)imide (LiN(FSO$_2$)$_2$) ("LIFSI") salt concentration of about 4M.

As seen electrochemical cells 120 and 130 have improved long term performance over electrochemical cell 110. More particularly, electrochemical cell 110, including lithium nitrate (LiNO$_3$), experiences immediate and continuous capacity fade, while electrochemical cells 120 and 130 experience little to no capacity fade. Accordingly, electrochemical cells 120 and 130, prepared in accordance with certain aspects of the present disclosure, show significant improved cycling performance and reduced capacity fade.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions comprising:
    an electrode comprising a chalcogen-containing electroactive material; and
    an electrolyte system comprising:
        one or more lithium salts selected from the group consisting of: lithium bis(fluorosulfonyl)imide (LiN(FSO$_2$)$_2$), bis(trifluoromethane)sulfonimide lithium salt (LiN(CF$_3$SO$_2$)$_2$), lithium hexafluorophosphate (LiPF$_6$), lithium hexafluoroarsenate (LiAsF$_6$), lithium tetrafluoroborate (LiBF$_4$), lithium perchlorate (LiClO$_4$), lithium iodide (LiI), lithium bromide (LiBr), lithium thiocyanate (LiSCN), lithium difluoro(oxalato)borate (LiBF$_2$(C$_2$O$_4$)), LiPF$_3$(C$_2$F$_5$)$_3$, LiPF$_4$(CF$_3$)$_2$, lithium tetrafluoro(oxalato)phosphate (LiPF$_4$(C$_2$O$_4$)), LiPF$_3$(CF$_3$)$_3$, LiSO$_3$CF$_3$, and combinations thereof; and
        a solvent mixture comprising dimethyl dicarbonate (DMDC) and at least one solvent selected from methyl formate, methyl acetate, methyl propionate, γ-butyrolactone, γ-valerolactone, 1,2-diethoxyethane, and ethoxymethoxyethane, wherein the electrolyte system is substantially free of lithium nitrate (LiNO$_3$) and the electrochemical cell has a minimum charge potential of greater than or equal to about 0.8 V to less than or equal to about 1.8 V.

2. The electrochemical cell of claim 1, wherein the electrochemical cell has a maximum charge potential of greater than or equal to about 2.5 V to less than or equal to about 3 V.

3. The electrochemical cell of claim 1, wherein the one or more lithium salts have a concentration in the electrolyte system of greater than or equal to about 2 M to less than or equal to about 5 M.

4. The electrochemical cell of claim 1, wherein the chalcogen-containing electroactive material comprises elemental sulfur or a sulfur-containing active material.

5. The electrochemical cell of claim 1, wherein the chalcogen-containing electroactive material comprises elemental selenium or a selenium-containing active material.

6. The electrochemical cell of claim 1, wherein the electrochemical cell has a Coulombic capacity loss of less than or equal to about 10% after 25 cycles of cycling lithium ions in the electrode of the electrochemical cell.

7. An electrochemical cell that cycles lithium ions comprising:
    a positive electrode comprising a chalcogen-containing electroactive material;
    a separator;
    a negative electrode comprising a negative electroactive material; and
    an electrolyte system comprising:
        one or more lithium salts selected from the group consisting of: lithium bis(fluorosulfonyl)imide (LiN(FSO$_2$)$_2$), bis(trifluoromethane)sulfonimide lithium salt (LiN(CF$_3$SO$_2$)$_2$), lithium hexafluorophosphate (LiPF$_6$), lithium hexafluoroarsenate (LiAsF$_6$), lithium tetrafluoroborate (LiBF$_4$), lithium perchlorate (LiClO$_4$), lithium iodide (LiI), lithium bromide (LiBr), lithium thiocyanate (LiSCN), lithium difluoro(oxalato)borate (LiBF$_2$(C$_2$O$_4$)), LiPF$_3$(C$_2$F$_5$)$_3$, LiPF$_4$(CF$_3$)$_2$, lithium tetrafluoro(oxalato)phosphate (LiPF$_4$(C$_2$O$_4$)), LiPF$_3$(CF$_3$)$_3$, LiSO$_3$CF$_3$, and combinations thereof; and
        a solvent mixture comprising dimethyl dicarbonate (DMDC) and at least one solvent selected from methyl formate, methyl acetate, methyl propionate, γ-butyrolactone, γ-valerolactone, 1,2-diethoxyethane, and ethoxymethoxyethane, wherein the electrolyte system is substantially free of lithium nitrate (LiNO$_3$) and the electrochemical cell has a minimum charge potential of greater than or equal to about 0.8 V to less than or equal to about 1.8 V and a maximum charge potential of greater than or equal to about 2.5 V to less than or equal to about 3 V.

8. The electrochemical cell of claim 7, wherein the one or more lithium salts have a concentration in the electrolyte system of greater than or equal to about 2 M to less than or equal to about 5 M.

9. The electrochemical cell of claim 7, wherein the chalcogen-containing electroactive material comprises elemental sulfur or a sulfur-containing active material.

10. The electrochemical cell of claim 7, wherein the chalcogen-containing electroactive material comprises elemental selenium or a selenium-containing active material.

11. The electrochemical cell of claim 7, wherein the electrochemical cell has a Coulombic capacity loss of less than or equal to about 10% after 25 cycles of cycling lithium ions in the electrode of the electrochemical cell.

12. A method of preparing an electrolyte system that improves or enhances energy density and promotes stable cycling performance of an electrochemical cell including an electrode comprising a chalcogen-containing electroactive material, wherein the electrochemical cell has a minimum charge potential of greater than or equal to about 0.8 V to less than or equal to about 1.8 V;
    mixing one or more lithium salts selected from the group consisting of: lithium bis(fluorosulfonyl)imide (LiN(FSO$_2$)$_2$), bis(trifluoromethane)sulfonimide lithium salt (LiN(CF$_3$SO$_2$)$_2$), lithium hexafluorophosphate (LiPF$_6$), lithium hexafluoroarsenate (LiAsF$_6$), lithium tetrafluoroborate (LiBF$_4$), lithium perchlorate (LiClO$_4$), lithium iodide (LiI), lithium bromide (LiBr), lithium thiocyanate (LiSCN), lithium difluoro(oxalato)borate (LiBF$_2$(C$_2$O$_4$)), LiPF$_3$(C$_2$F$_5$)$_3$, LiPF$_4$(CF$_3$)$_2$, lithium tetrafluoro(oxalato)phosphate (LiPF$_4$(C$_2$O$_4$)), LiPF$_3$(CF$_3$)$_3$, LiSO$_3$CF$_3$, and combinations thereof; and a solvent mixture comprising dimethyl dicarbonate (DMDC) and at least on solvent selected from methyl formate, methyl acetate, methyl propionate, γ-butyrolactone, γ-valerolactone, 1,2-diethoxyethane, and ethoxymethoxyethane to form an electrolyte system that is substantially free of lithium nitrate (LiNO$_3$).

13. The method of claim 12, wherein the electrochemical cell has a maximum charge potential of greater than or equal to about 2.5 V to less than or equal to about 3 V.

14. The method of claim 12, wherein the one or more lithium salts have a concentration in the electrolyte system of greater than or equal to about 2 M to less than or equal to about 5 M.

15. The method of claim 12, wherein the chalcogen-containing electroactive material comprises elemental sulfur or a sulfur-containing active material.

16. The method of claim 12, wherein the chalcogen-containing electroactive material comprises elemental selenium or a selenium-containing active material.

17. The method of claim 12, wherein the electrochemical cell has a capacity loss of less than or equal to about 10% over 100 cycles.

* * * * *